United States Patent
Mader

(10) Patent No.: US 8,979,617 B2
(45) Date of Patent: Mar. 17, 2015

(54) ARRANGEMENT FOR GUIDING TOOLS

(75) Inventor: Leopold Mader, Neuhofen/Ybbs (AT)

(73) Assignee: Lisec Austria GmbH, Seitenstetten (AT)

( * ) Notice: Subject to any disclaimer, the term of this patent is extended or adjusted under 35 U.S.C. 154(b) by 404 days.

(21) Appl. No.: 13/515,095

(22) PCT Filed: Mar. 17, 2011

(86) PCT No.: PCT/AT2011/000134
§ 371 (c)(1),
(2), (4) Date: Jun. 11, 2012

(87) PCT Pub. No.: WO2011/123872
PCT Pub. Date: Oct. 13, 2011

(65) Prior Publication Data
US 2012/0289132 A1 Nov. 15, 2012

(30) Foreign Application Priority Data
Apr. 8, 2010 (AT) .................................. A 564/2010

(51) Int. Cl.
*B24B 19/00* (2006.01)
*B23Q 17/22* (2006.01)
(52) U.S. Cl.
CPC .................................. *B23Q 17/2233* (2013.01)
USPC ............ 451/442; 451/282; 451/545; 451/549
(58) Field of Classification Search
CPC ............ B24B 9/00; B24B 9/10; B24B 9/102; B24B 9/105; B24B 9/107
USPC .................. 144/253.1, 253.2, 253.3, 253.9; 409/205, 225; 451/43, 44, 241, 267, 451/282, 439, 545, 549, 555, 442
See application file for complete search history.

(56) References Cited

U.S. PATENT DOCUMENTS 3,893,372 A * 7/1975 Strakeljahn .................... 409/180
4,528,780 A * 7/1985 Halberschmidt et al. ........ 451/14
(Continued)

FOREIGN PATENT DOCUMENTS

CN 2920530 7/2007
DE 2 028 755 A1 12/1971
(Continued)

OTHER PUBLICATIONS

International Search Report, dated Aug. 19, 2011, from corresponding PCT application.
(Continued)

*Primary Examiner* — Timothy V Eley
(74) *Attorney, Agent, or Firm* — Young & Thompson

(57) ABSTRACT

An arrangement (1) including a tool (7) and a feeler device (11) is movably guided along the edge of a workpiece (5) so that the workpiece is machined, for example, trimmed, along the edges (3) of the workpiece by the tool. The arrangement (1) can be adjusted perpendicularly to the plane of the workpiece, whereas the feeler device, which is designed for example as a Bernoulli disk (13), has a constant distance from the workpiece, so that the tool also is always guided at the correct position relative to the edge of the workpiece. Thus even for workpieces deviating from the target position, for example workpieces that are not level, the tool is always guided in such a way that the tool is correctly oriented relative to the center plane of the workpiece and, for example, the trimming of the borders at the edges of the workpiece is performed reliably.

8 Claims, 3 Drawing Sheets

(56) References Cited

U.S. PATENT DOCUMENTS

Figure 1:
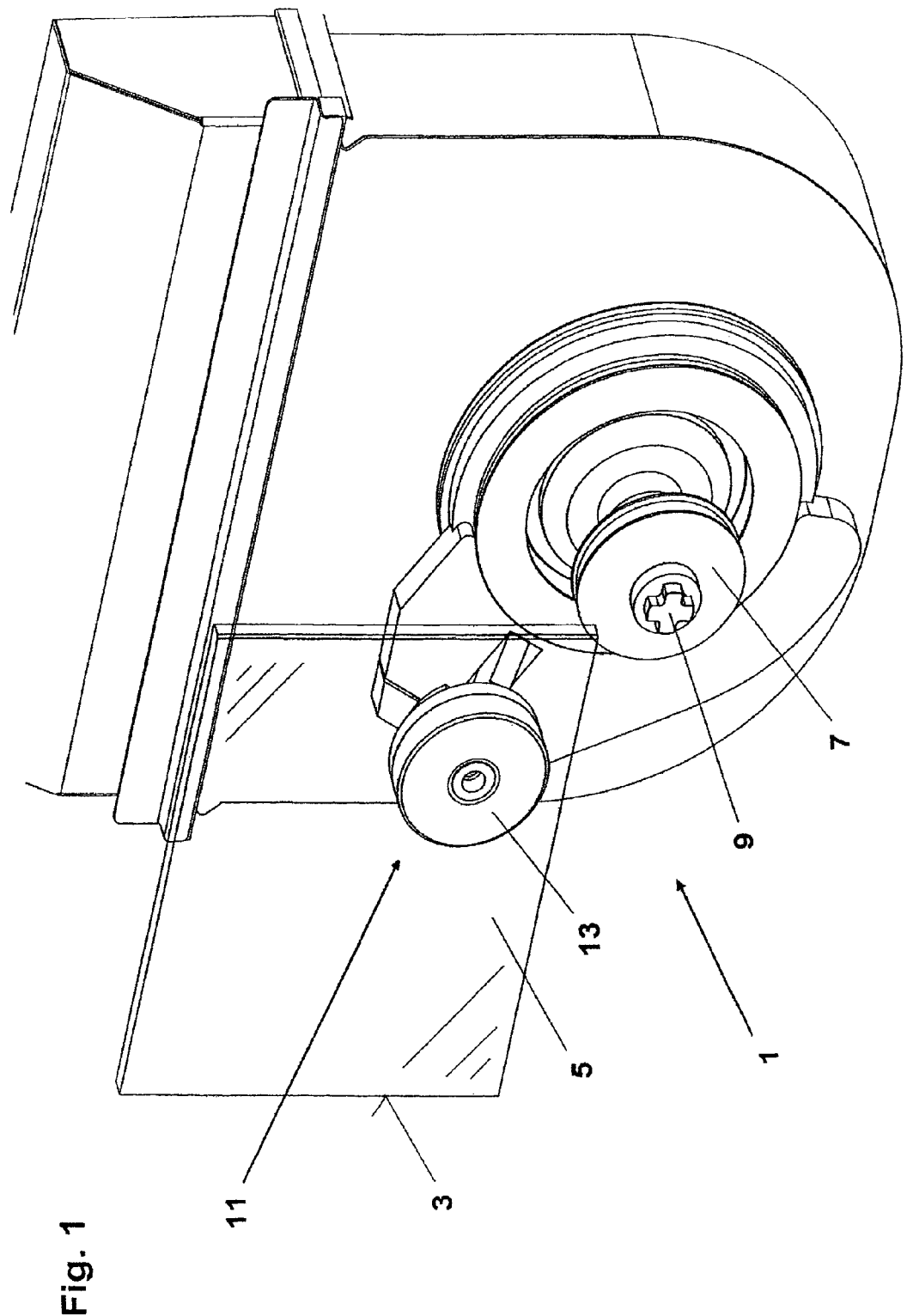

| | | | | |
|---|---|---|---|---|
| 4,934,109 | A | * | 6/1990 | Allred .............................. 451/51 |
| 5,480,345 | A | * | 1/1996 | Bethea ........................... 451/234 |
| 8,162,726 | B1 | * | 4/2012 | Jorgensen ...................... 451/344 |
| 2004/0053565 | A1 | * | 3/2004 | Hibbert ......................... 451/120 |
| 2010/0052345 | A1 | | 3/2010 | Chang et al. |
| 2010/0112910 | A1 | * | 5/2010 | Brown et al. ................... 451/44 |

FOREIGN PATENT DOCUMENTS

| | | |
|---|---|---|
| DE | 8514425 U1 | 7/1985 |
| DE | 41 134 14 A1 | 10/1992 |
| DE | 101 44 718 A1 | 5/2002 |
| JP | 05329702 | 12/1993 |
| WO | 96/13355 A1 | 5/1996 |

OTHER PUBLICATIONS

Austria Search Report, dated Feb. 9, 2011, from corresponding Austrian Application.
CN Office Action dated Feb. 21, 2014; Application No. 201180005357.3.

* cited by examiner

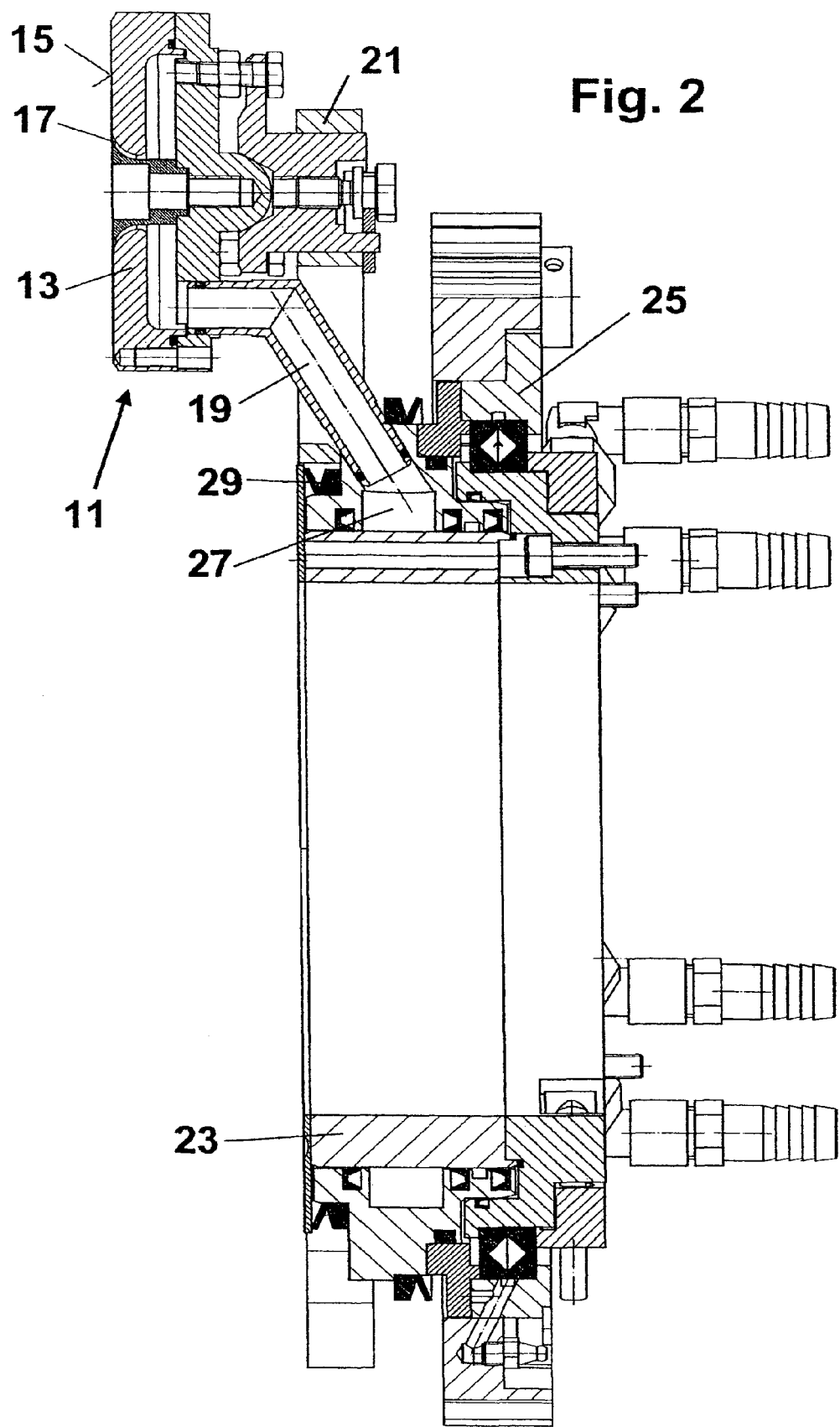

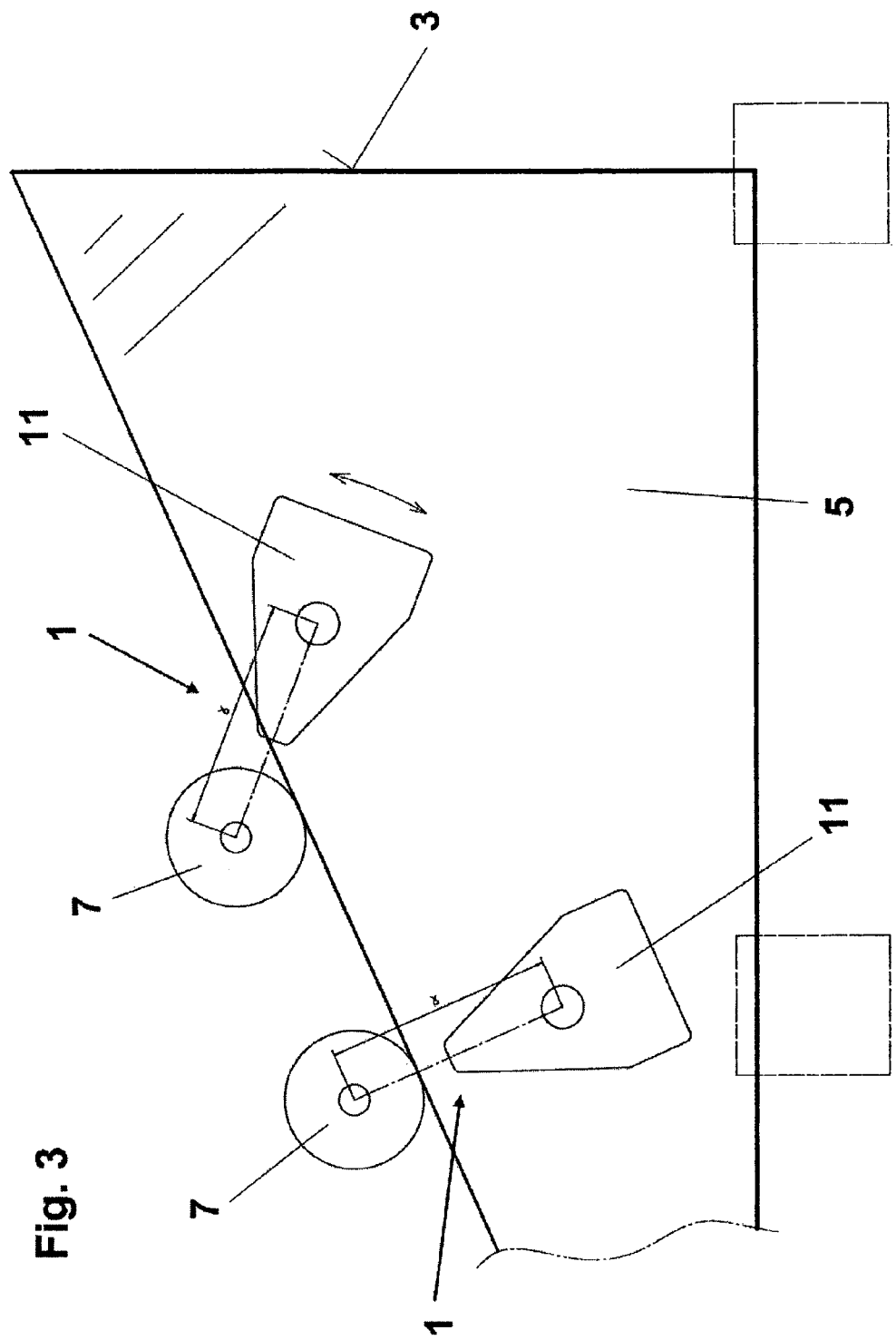

ARRANGEMENT FOR GUIDING TOOLS

The invention relates to an arrangement for guiding tools that work the edges of plate-shaped workpieces, specifically glass plates, along the edges of the workpiece.

Such tools can be grinding wheels with which the edges of glass panes are ground and/or edged, or other tools, e.g., sealing jets for insulating glass, that are moved along the edges of the plate-shaped workpieces to work them.

Usually, the plate-shaped workpieces, such as glass plates, are kept in holding devices by means of suction cups, rollers, support rollers and the like, and the working tool moves along the edges. With the means of the state of the art, the guiding of tools along the edges of plate-shaped workpieces, unless they have an irregular outline (other than rectangle or square), is largely a solved problem.

A problem arises when the plate-shaped workpiece is not completely even, but deviates from the planar position to one side and/or the other and is therefore "curved" or "bulging." Known tools with which the edges of plate-shaped workpieces are worked cannot follow such deviations, so that difficulties and inaccuracies in the working occur because the tool is no longer correctly aligned with respect to the workpiece.

The object of the invention is to remedy this problem by proposing a device with which tools can be guided in such a way that they are aligned with respect to the edge of the workpiece even when in some areas they deviate from the (planar) target position.

This object is achieved according to the invention with an arrangement that has the features of claim 1.

Preferred and advantageous embodiments of the invention are the subjects of the subclaims.

Since in the arrangement according to the invention the tool is connected to a feeler device that is kept at a defined distance from one of the major surfaces of the workpiece, the tool can be correctly aligned with respect to the edge of the workpiece even when the workpiece deviates to one side or the other, for example is arched out of the target position, and deviates out of the planar position—the main plane of the workpiece.

In a preferred embodiment, the feeler device that is coupled to the tool is a Bernoulli device that, under the action of the Bernoulli Effect, draws in one of the major surfaces of the workpiece with a defined distance between them. This Bernoulli device is preferably a device that is exposed to a fluid, especially a liquid medium, whereby the liquid medium is, for example, water.

In one embodiment, the feeler device, for example the Bernoulli device, is coupled to the tool that is arranged to be adjustable with respect to the plane of the workpiece so that even if the workpiece deviates at least in some areas from the target position, is arched, for example, i.e., deviates in some areas from the plane, the tool will be correctly aligned with respect to the edge of the workpiece in at least the one area in which the workpiece deviates from the plane.

In one embodiment of the invention, the feeler device, especially the Bernoulli device, is arranged to be able to pivot relative to the tool—in the case of a grinding wheel, for example, to be able to pivot around the axis of the grinding wheel—so that the alignment between the feeler device and the tool that is optimum in each case for reliably guiding the tool can be established with respect to the workpiece.

The arrangement according to the invention, in which a tool that works the edge of a plate-shaped workpiece is coupled to a feeler device—for example, a Bernoulli device—in order to keep the tool in the alignment that is right with respect to the edge of the workpiece, i.e., the alignment that is optimum for working the workpiece, can also be used for workpieces that are curved in any direction, such as, for example, windshields for vehicles, curved glass plates for showers, etc., since even in such cases, the feeler device always guides the tool aligned in the correct position relative to the edge and the surface of the workpiece.

Additional features and details of the invention are presented in the following description of a preferred embodiment, referring to the drawing.

Here:

FIG. 1 shows, partially schematized and in oblique view, an arrangement according to the invention, FIG. 2 shows in cross-section the feeler device with its mounting, but without the tool of FIG. 1, and FIG. 3 shows a schematized view of the use of the arrangement according to the invention.

In the embodiment shown in FIG. 1, the arrangement 1 according to the invention serves to grind (trim) the edges 3 of a glass plate 5 by working it with a grooved grinding wheel 7. The grooved grinding wheel 7 is arranged on a spindle 9 and is coupled to a drive, not shown in detail.

With the guiding devices that are known in the state of the art and are also not shown in detail in FIG. 1, the grinding wheel 7 is moved in such a way that it moves along the edge 3 of the workpiece, which in the embodiment shown is rectangular, in the form of a glass plate 5, to work its edges 3, e.g., to grind and/or trim them.

In this case, it is further assumed that the glass plate 5 is held by holding devices, not shown, such as suction cups, support rollers, and the like.

For example, the grooved grinding wheel 7 of the tool is moved around the glass plate 5 to be worked by having the grooved grinding wheel 7 be moved up and down and the glass plate 5 be moved back and forth horizontally. The tool can be moved along edges 3 of workpieces of any shape by combining the vertical and horizontal movements.

In order to keep the tool, in the embodiment shown the grinding wheel 7, correctly aligned in each case with respect to the edge 3 of the glass plate 5 to be worked—i.e., with respect to a mid-plane of the glass plate 5 that is parallel to the plane of the glass plate 5 ("target position") in such a way that the mid-plane of the grinding wheel 7 is flush with the mid-plane of the workpiece (glass plate 5), i.e., lying in the same plane—a feeler device 11 is connected to the tool 7 and is adjustably arranged together with the tool 7 in the direction of the axis of the tool 7 (i.e., normal to the plane of the glass plate 5).

In the embodiment shown, the feeler device 11 is a feeler device 11 with a Bernoulli disk 13. On its surface 15 that faces the glass plate 5, the Bernoulli disk 13 has a ring-shaped jet 17 for the discharge of a fluid, which in the embodiment shown is water. Owing to the discharge of the water from the ring jet 17, the Bernoulli disk 13 as a feeler device is kept at a defined distance from the glass plate 5 (specifically by the Bernoulli forces), so that the grinding wheel 7, i.e., the (working) tool, is always correctly aligned with respect to the glass plate 5 in order to work its edge 3 reliably and without deviations to one side of the mid-plane of the glass plate 5 or the other. This is also always accomplished even when the glass plate 5 does not have straight edges 3 and deviates from the target position, for example, when the edge area is curved to one side or the other and deviates from the (mid-) plane of the glass plate 5.

Water is fed to the Bernoulli disk 13, especially the ring jet 17 in it, via a line 19.

FIG. 2 also shows that the mounting 21 for the Bernoulli disk 13 is attached to a ring-shaped component 23 that is able to twist with respect to the base body 25. Here, the channel 27 via which water is fed to the jet 17 in the Bernoulli disk 13 is sealed by multiple seals 29 with respect to the fixed base body 25.

The carrier 21 for the Bernoulli disk 13 is arranged in the device to be able to pivot around the axis of the grinding wheel 7 and its spindle 9, so that the position of the Bernoulli disk 13 can be changed relative to the grinding wheel 7. This arrangement ensures an optimum relative position between the feeler device 11 and the tool (e.g., the grinding wheel 7).

An advantageous side effect of the feeler device 11 in the form of the Bernoulli disk 13 is that any vibrations of the glass plate 5 in the area of the grinding wheel 7 are damped so that they will not be able to have an adverse effect.

The relative position transverse to the plane (surface) of the workpiece 5 between the feeler device, on the one hand, and the tool 7, on the other hand, with regard to the plane of the workpiece 5 to be worked—in the embodiment shown the glass plate 5—is, for example, variable (adjustable), but remains constant during a machining operation. Thus, the arrangement 1 according to the invention can be adapted to different tools 7 and/or different workpieces 5.

FIG. 3 schematically indicates how the arrangement 1 according to the invention can be moved with the feeler device 11 and the tool 7 (grinding disk) along the edge 3 of a glass plate 5. FIG. 3 also shows in particular that the relative position between the feeler device 11 and the tool 7 can be selected by pivoting the feeler device 11 around the axis of the tool 7 in each case in such a way that the assigned task of the tool 7 can be optimally executed. This also makes it possible, as in the example of FIG. 3 shown, to properly work workpieces (glass plates 5) with a shape of the edges 3 that is other than rectangular.

In summary, an embodiment of the invention is described as follows.

An arrangement 1 with a tool 7 and a feeler device 11 is movably guided along the edge of a workpiece 5 so that the workpiece 5 is worked along its edges 3, e.g., trimmed, by the tool 7. The arrangement 1 is adjustable transverse to the plane of the workpiece 5, whereby the feeler device 11, which is designed, for example, as a Bernoulli disk 13, has a constant distance between it and the workpiece 5, so that the tool 7 is also always guided in the correct position with respect to the edge 3 of the workpiece 5, i.e., even in the case of workpieces 5 that deviate from the target position, e.g., are not planar, it is always guided in such a way that it is correctly aligned with respect to the mid-plane of the workpiece 5 and, for example, reliably carries out the trimming of the margins on the edges 3 of the workpiece 5.

The invention claimed is:

1. Arrangement (1) for guiding a tool (7) along an edge (3) of a plate-shaped work piece (5), the arrangement comprising a feeler device (11) that, with the tool (7), is adjustable transverse to a plane of the plate-shaped work piece (5), wherein the feeler device (11) maintains a constant distance from the plate-shaped work piece (5), and wherein the feeler device (11) has a Bernoulli disk (13).

2. Arrangement according to claim 1, wherein the Bernoulli disk (13) maintains a defined distance from a major surface of the plate-shaped work piece (5).

3. Arrangement according to claim 2, wherein the feeler device (11) is mounted to be able to pivot around the tool (7).

4. Arrangement according to claim 1, wherein the feeler device (11) is mounted to be able to pivot around the tool (7).

5. Arrangement according to claim 1, wherein the tool (7) is a grinding wheel and wherein the feeler device (11) is mounted to be able to pivot around the axis of the grinding wheel (7).

6. Arrangement according to claim 1, further comprising a ring-shaped jet (17) for discharge of fluid onto a surface of the Bernoulli disk that faces the plate-shaped work piece.

7. Arrangement according to claim 1, wherein the tool (7) is adapted to move along the edge (3) of the plate-shaped work piece (5).

8. Arrangement according to claim 1, wherein the plate-shaped work piece (5) is adapted to move in a first direction, and wherein the tool is adapted to move in a second direction perpendicular to the first direction.

\* \* \* \* \*